Oct. 15, 1940.           C. S. STEELMAN           2,217,712
              CONCEALED HYDRANT WITH AUTOMATIC VALVE
                  Filed April 11, 1938        4 Sheets-Sheet 3
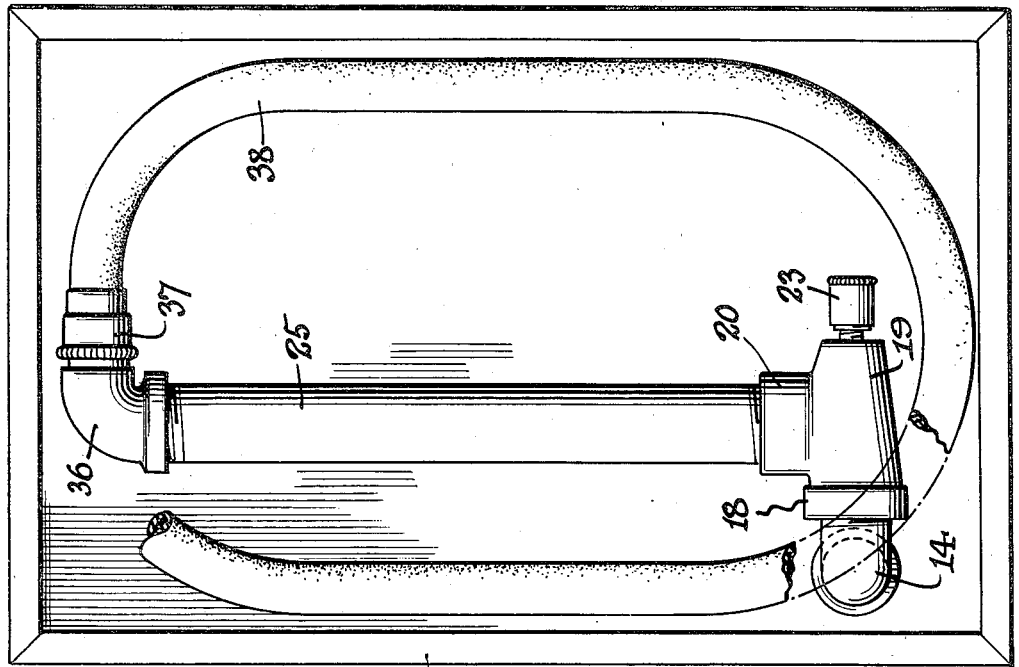
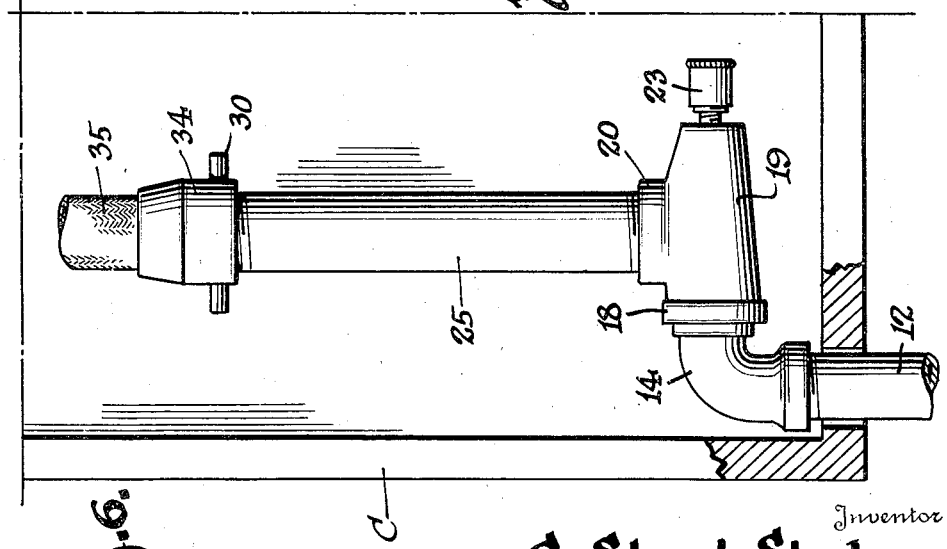
Inventor
C. Stuart Steelman
By Lester L. Sargent
Attorney Oct. 15, 1940.  C. S. STEELMAN  2,217,712
CONCEALED HYDRANT WITH AUTOMATIC VALVE
Filed April 11, 1938   4 Sheets-Sheet 4
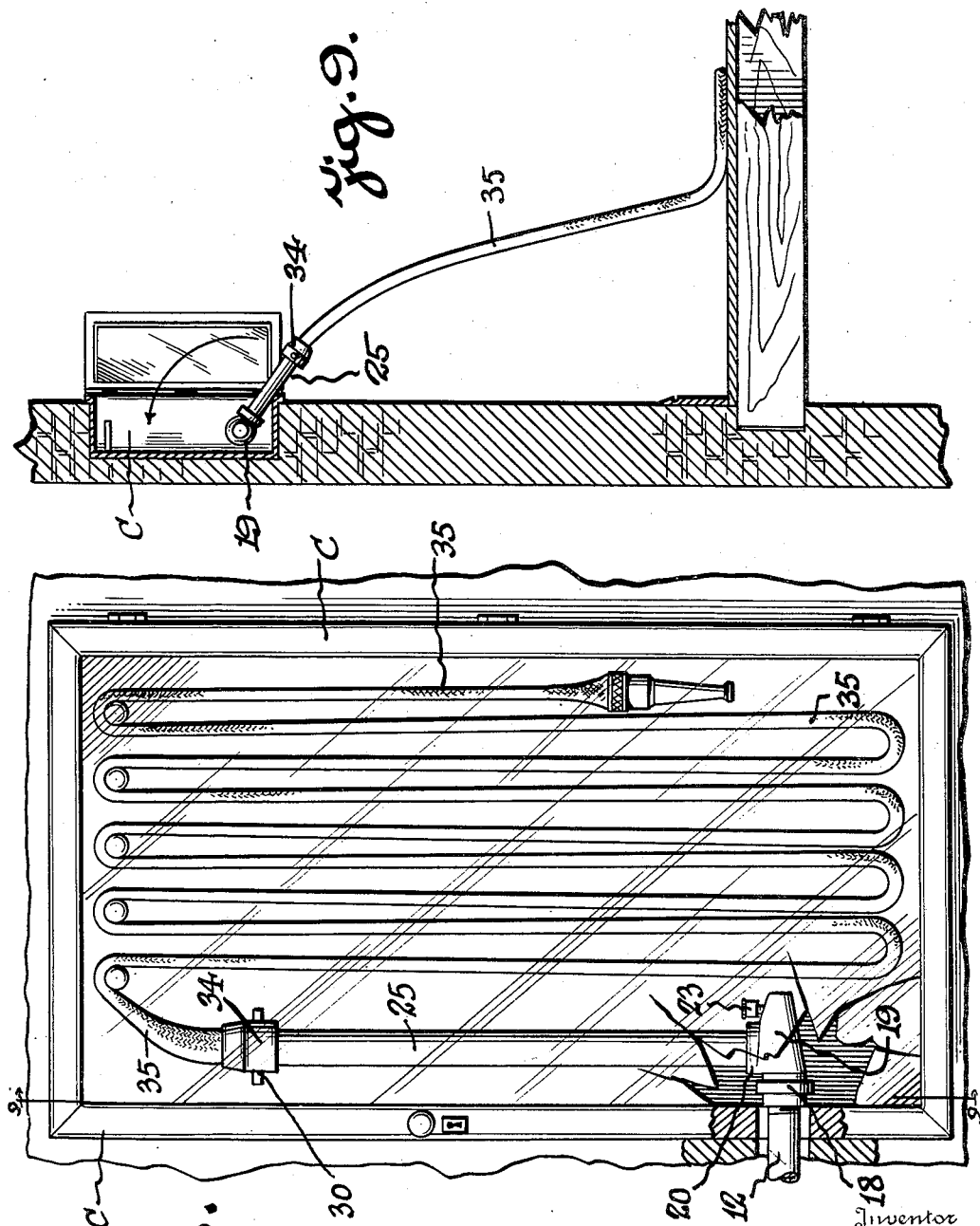
Inventor
C. Stuart Steelman
By Lester L. Sargent
Attorney Patented Oct. 15, 1940

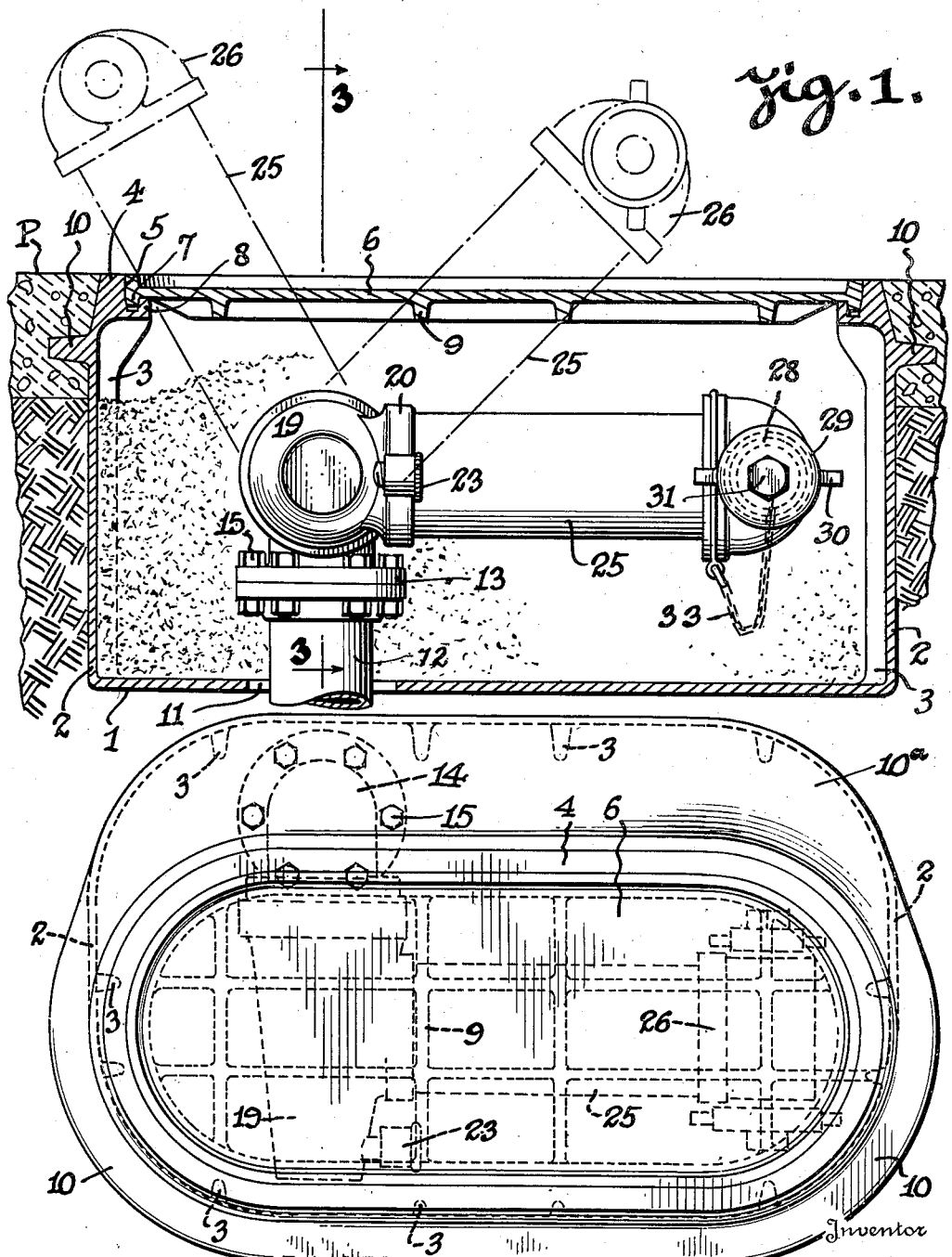

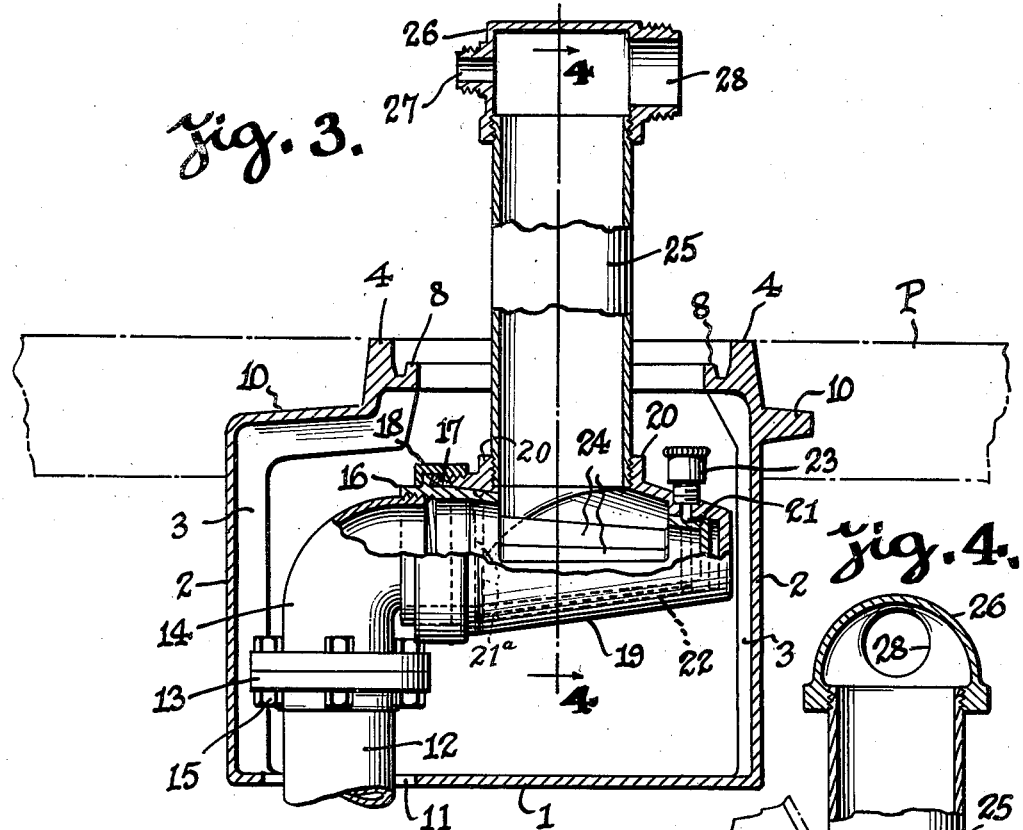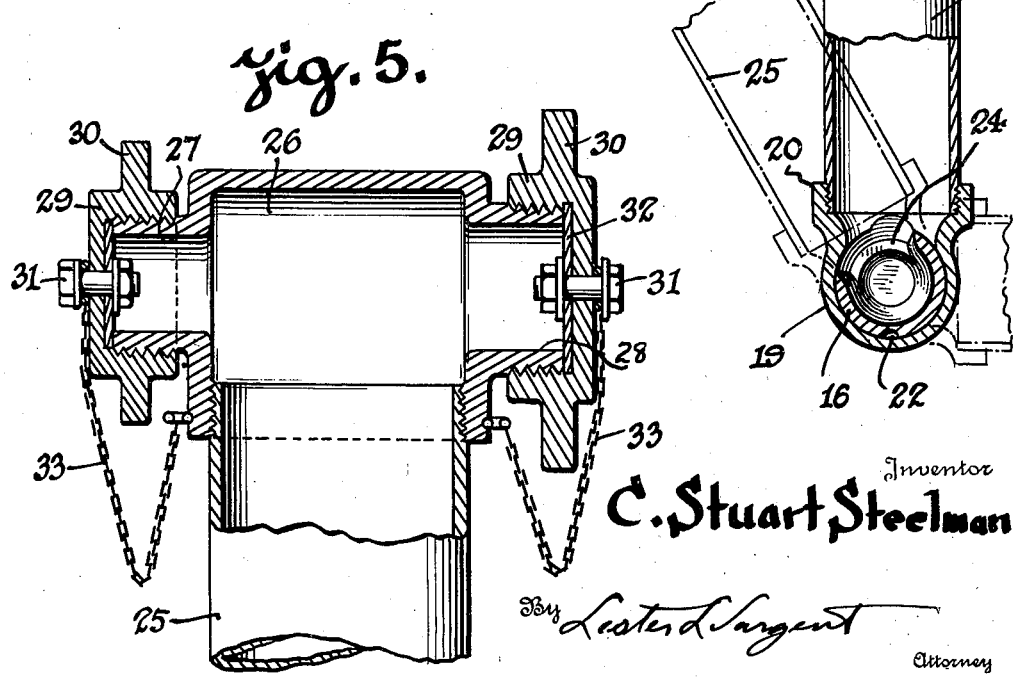

2,217,712

UNITED STATES PATENT OFFICE 2,217,712

CONCEALED HYDRANT WITH AUTOMATIC VALVE

Charles Stuart Steelman, Glendale, Calif.

Application April 11, 1938, Serial No. 201,447

6 Claims. (Cl. 137—13)

The object of my invention is to provide a hydrant or fire plug which can be kept in a concealed compartment under the surface of the street at the center of the street and equally accessible to either side of the street or alley, and which when there is a fire, may be uncoved and swung to an angle above the surface of the street sufficient to permit of attachment of the hose of the fire engine to the fire plug or hydrant, and which may then be swung in the same direction to a similar angle on the opposite side to automatically open the valve and allow the water to flow into the fire hose.

Another object of my invention is to provide a hydrant which can be installed in the street and not on the sidewalk as with the present type, and which will not interfere with the parking of vehicles. It is also an object of my invention to provide a hydrant of this type which can be used in alleys and which, as it folds up, will not be knocked off by vehicles.

It is a further object to provide a fire plug equally accessible to either side of the street or alley.

It is a further object of my invention to provide a modification of the invention for mounting in a cabinet or niche in apartment houses or buildings and which will pull out from the wall in a similar manner.

It is a further object of my invention to provide a modification of the invention for use in a concealed compartment in yards of homes for attaching ordinary garden hose and which will permit the hose to be rolled up over it and thus conveniently conceal it and place it where it will be ready for use when needed.

It is a further object of my invention to provide a hydrant or fire plug that is quick in action and easy to operate. It is a further object to provide a fire plug or hydrant that can be easily insulated from freezing in cold climates without making it inaccessible for use.

I attain these and other objects of my invention by the mechanism illustrated in the accompanying drawings, in which—

Figure 1 is a side elevation of the invention installed in its sub-pavement compartment, the dotted lines indicating the positions to which it may be moved, first to connect the fire hose, and second to open the valve so that the water will flow through;

Fig. 2 is a top plan view of the compartment with the cover in place, the concealed fire plug being indicated in dotted lines;

Fig. 3 is a vertical section of the invention on line 3—3 of Fig. 1;

Fig. 4 is a section on line 4—4 of Fig. 3;

Fig. 5 is an enlarged section through the head of the fire plug with the caps in place;

Fig. 6 is a side elevation of the invention suitably modified as to size and arrangement for installation in a cabinet or recess in the wall of a building;

Fig. 7 is a modification of the invention of suitable size and design for use with a garden hose;

Fig. 8 is a side elevation of the form of the invention shown in Fig. 6 with the hose attached as seen through the glass door of the cabinet in which it is mounted for immediate use in the case of fire; and Fig. 9 is a view on section line 9—9 of Fig. 8 but with the door to cabinet C in open position showing the position the valve 25 will assume when the hose is drawn out from the casing for use.

Like numerals designate like parts in each of the several views.

Referring to Figs. 1-5 of the drawings, I provide an underground housing or cabinet, preferably of metal, consisting of a bottom 1, sides 2, ribs 3 reenforcing the sides, top rim 4, groove 5 to receive the lid, and a suitable lid 6, the lid having a flange 7 seating in the groove 5. Lid 6 is preferably provided with reenforcing ribs 9. As shown in Figure 1, the housing has an outwardly projecting rib 10 to anchor the cabinet more securely in the pavement.

The cabinet has an underground lateral extension 10a, as shown in Fig. 2, to accommodate the water pipe 12 which enters the bottom of the housing through the opening 11 and is connected by a joint 13 and bolts 15 to the L-pipe connection 14.

Member 14 is externally threaded for engagement with the open end of an inner preferably frusto-conical valve casing 16. A correspondingly shaped preferably frusto-conical outer valve casing 19 is rotatably mounted on inner valve casing 16. Outer casing 19 has a mouth 20 on which hydrant 25 is screw-threaded and in communication with it. Casings 16 and 19 are made water tight by annular packing 17 and clamping ring 18, screw-threaded on the larger end of outer casing 19, as shown in Fig. 3.

I prefer to provide a lubricated valve having encircling oil grooves 21 and 21a near the respective ends of the inner casing 16 and in communication by a longitudinal groove 22 on the underside of casing 16. A suitable oil cup 23 opens into oil groove 21.

Valve opening 24 of inner casing 16 is normally closed when the hydrant 25 is in the normal horizontal position shown in heavy lines in Fig. 1. Detachably secured to the hydrant 25 is a suitable cap or cover 26. Hydrant cap 26 has one or more threaded hose connections or nozzles 27 and 28 shown in Fig. 3 on which suitable nozzle caps 29 are screw-threaded. Caps 29 have projections 30 functioning as hand-hold members. Attached to caps 29 are bolts 31, washers 32, and chains 33 engaged by the bolts 31 and attached to the hydrant cover 26, as shown in Fig. 5.

In the modified form of my invention shown in Figs. 6, 8, and 9, the hydrant 25 is normally disposed in a vertical position against the back of the cabinet or niche in the wall of a building and is provided with a suitable coupling 34 to which the hose 35 is permanently secured. When there is occasion to use the fire hose, it is withdrawn from its support, and this in turn swings the hydrant down to a depending position shown in Fig. 9, and thereby automatically opens the valve passage 24 of the inner casing 16.

Referring to Fig. 7, there is illustrated another modification of the invention for use with a garden hose, the hydrant 25 having an L-shaped coupling 36 secured to its outer end, to which in turn is screw-threaded the coupling 37 which is permanently attached to a garden hose 38 which, when not in use, may be coiled up in a cabinet G, which is preferably positioned underground and provided with a suitable lid 6.

As shown in Fig. 3, I preferably provide a lubricated valve having an oil cup 23 through which grease may be inserted and which will work around through the groove 21, longitudinal groove 22 and encircling groove 21a. The escape of water between the outer valve casing 19 and inner valve casing 16 is prevented by the packing 17 and clamping ring 18.

In climates where there is danger of the water freezing in winter, the hydrant may be protected by suitable insulation such as sawdust shown in Fig. 1, or the cover 6 may be provided with other suitable insulation material.

The operation of the invention is illustrated in Fig. 1 of the drawings. Normally the hydrant 25 is disposed in a horizontal concealed position in the underground cabinet which is placed in the center of the street where it will always be accessible to fire engines and will not interfere with parking of automobiles or other vehicles adjacent the sidewalk. When there is occasion to use the hydrant, the lid 6 is removed and the hydrant is swung upwardly to an acute angle of say between 35 and 40 degrees, as shown in the dotted lines, with the cover 26 of the hydrant 25 sufficiently above the level of the pavement P to permit of conveniently attaching the fire hose to the nozzle 28 and also to nozzle 27 if desired. The hydrant is then swung to the obtuse angle or extreme left position, as shown in dotted lines at the left portion of Fig. 1, in which position the outer casing 19 has been moved to a plane where its opening into the hydrant 25 is aligned with the passage 24 through the inner valve casing 16, thus permitting the water to flow through the valve into hydrant 25 and through nozzle 28 or 27 to the fire hose.

In the form of the invention illustrated in Figs. 6, 8, and 9 where the invention is applied to a fire hose contained in a cabinet C in a building, the hose 35 when withdrawn from the cabinet and pulled out, will by its weight, swing the hydrant 25 from its normal vertical position as shown in Fig. 8, to the downwardly slanting position shown in Fig. 9 and thereby swing the outer valve casing 19 to bring its opening into hydrant 25 into alignment with valve passage 24 through inner valve casing 16, and thus automatically open the valve, saving the necessity and time required for manual operation of the conventional manually controlled valve.

Referring to Fig. 7 illustrating the invention applied to a garden hose, it may be noted that the garden hose 38 may be kept permanently attached to the device ready for use and coiled up in the concealed cabinet G. On pulling out the hose and swinging the hydrant 25 from a normally horizontal to an upright rearwardly slanting position similar to what is illustrated in dotted lines in Fig. 1 of the drawings, the outer valve casing 19 is swung to a position where its mouth 20 is aligned with the valve passage 24 of inner valve casing 16 to permit water to flow in full force through the hydrant.

I claim:

1. In a concealed hydrant with automatic valve, the combination of a hydrant, an outer valve casing in communication with said hydrant, an inner valve casing on which the outer valve casing is rotatably mounted, said inner casing having a relatively small valve passage suitably positioned to be maintained in a closed position both when the hydrant is in an inoperative and concealed position and when it is swung to a plane at an acute angle to its original position and partly exposed for attachment to a fire hose and which will be open only when the hydrant and the outer valve casing is swung to a plane at an obtuse angle to its original position to align the hydrant with the valve passage of the inner casing.

2. In a device of the type described, the combination of a hydrant having a plurality of nozzles for coupling to a fire hose, an outer valve casing in communication with said hydrant and to which it is affixed, an inner valve casing on which the aforesaid outer valve casing is rotatably mounted, said inner casing having a valve passage extending across less than one-third of its circumference and which is closed by the outer casing when the hydrant is in an inoperative position but which is opened by the swinging of the hydrant to a plane at an obtuse angle to its original position, but which will not be opened when the hydrant is swung only to an acute angle from its original position.

3. In a hydrant of the type described, the combination of a hydrant normally disposed in an inoperative position, an outer valve casing in communication with said hydrant and to which it is affixed, an inner valve casing in which the outer valve casing is rotatably mounted, said outer and inner valve casings each being closed at one end, means for supplying lubricant between casings at said closed end, a clamp ring and packing mounted on the open end of said outer casing to make a tight seal between it and the inner casing, said inner casing having a cross sectional area not greater than the cross sectional area of the hydrant, the valve passage being suitably positioned to be maintained in a closed position both when the hydrant is in its normal inoperative position and also when it is swung to a plane at an acute angle thereto and partly exposed for attachment to a fire hose, but which will be open only when the hydrant is swung to a plane at an obtuse angle to its original position for use.

4. In a concealed hydrant with automatic valve, the combination of a hydrant, an outer valve casing in communication with the hydrant, an inner valve casing on which the outer valve casing is rotatably mounted, said outer valve casing being swingable to either of three positions and through an arc in excess of 90°, an inner casing having a relatively small valve passage suitably positioned to be maintained in a closed position both when the hydrant is in an inoperative and concealed position and also when it is swung to a plane at an obtuse angle to its original position and partly exposed for attachment to a fire hose, and means permitting the movement of the outer valve casing to but not beyond a plane at an obtuse angle to its original position to align the hydrant with the valve passage of the inner casing for operation.

5. In a device of the type described, the combination of a hydrant having a plurality of nozzles for coupling to a fire hose, an outer valve casing in communication with said hydrant and to which it is affixed, an inner valve casing on which the aforesaid outer valve casing is rotatably mounted, said inner casing having a valve passage extending across less than one-third of its circumference and which is closed by the outer casing when the hydrant is in its initial position and also when the hydrant is swung to an acute angle to its initial position for attachment to a fire hose, and means limiting the swinging of the hydrant to a plane at an obtuse angle to its original position to open the valve.

6. In a hydrant of the type described, the combination of a hydrant normally disposed in an inoperative position, an outer valve casing in communication with said hydrant and to which it is affixed, an inner valve casing on which the outer valve casing is rotatably mounted, said casing having a lateral valve opening, said outer and inner valve casings each being closed at one end, the inner valve casing being open at the opposite end, means for supplying lubricant between casings at said closed end, said means being out of communication with the valve opening at all times in the complete operation of the valve, whereby to retain the lubricant, a clamp ring and packing mounted on the open end of said outer casing to make a tight seal between it and the inner casing, said inner casing having a cross sectional area not greater than the cross sectional area of the hydrant, the valve passage being suitably positioned to be closed both when the hydrant is in its initial inoperative position and also when it is swung to a plane at an acute angle thereto and partly exposed for attachment to a fire hose, but which will be open only when the hydrant is swung to a plane at an obtuse angle to its original position for use.

CHARLES STUART STEELMAN.